(12) United States Patent
Vanderschaegen et al.

(10) Patent No.: US 12,086,574 B1
(45) Date of Patent: Sep. 10, 2024

(54) TECHNIQUES TO CONVERT BYTECODE GENERATED FOR A FIRST EXECUTION ENVIRONMENT TO MACHINE CODE FOR A SECOND EXECUTION ENVIRONMENT

(71) Applicant: Amazon Technologies, Inc., Seattle, WA (US)

(72) Inventors: Valere Joseph Vanderschaegen, Sequim, WA (US); Scott Henry, Minneapolis, MN (US); Scott Atkins, Lino Lakes, MN (US); John Sebastian Lyon-Smith, Kingston, WA (US); Ryan Peters, Calgary (CA)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 17/513,502

(22) Filed: Oct. 28, 2021

(51) Int. Cl.
*G06F 8/41* (2018.01)
*G06F 8/30* (2018.01)

(52) U.S. Cl.
CPC .............. *G06F 8/427* (2013.01); *G06F 8/315* (2013.01); *G06F 8/434* (2013.01)

(58) Field of Classification Search
None
See application file for complete search history.

(56) References Cited

U.S. PATENT DOCUMENTS

| | | | |
|---|---|---|---|
| 5,978,585 A * | 11/1999 | Crelier | G06F 8/48 717/145 |
| 6,110,226 A * | 8/2000 | Bothner | G06F 9/45516 717/153 |

(Continued)

FOREIGN PATENT DOCUMENTS

| | | | | |
|---|---|---|---|---|
| WO | WO-0068902 A1 * | 11/2000 | ......... | G06Q 20/341 |

OTHER PUBLICATIONS

Sagonas, Konstantinos, Chris Stavrakakis, and Yiannis Tsiouris. "ErLLVM: an LLVM backend for Erlang." Proceedings of the eleventh ACM SIGPLAN workshop on Erlang workshop. 2012. (Year: 2012).*

Rigger, Manuel, et al. "Bringing low-level languages to the JVM: Efficient execution of LLVM IR on Truffle." Proceedings of the 8th International Workshop on Virtual Machines and Intermediate Languages. 2016. (Year: 2016).*

*Primary Examiner* — Matthew J Brophy

(74) *Attorney, Agent, or Firm* — Eversheds Sutherland (US) LLP

(57) ABSTRACT

Systems, devices, and methods are provided for generating machine code for a second execution environment based on bytecode generated for a first execution environment. A method may comprise steps to obtain a set of bytecode instructions executable in a first execution environment, parse the set of bytecode instructions to determine at least one stack-based class object, determine an intermediate representation (IR) of the set of bytecode instructions, wherein the intermediate representation comprising at least one single static assignment (SSA)-based representation that corresponds to the at least one stack-based class object, and translate the intermediate representation into machine code that is executable in the second execution environment. For example, Java bytecode generated to run on a Java Virtual Machine (JVM) may be translated to machine code that runs in an execution environment that lacks or otherwise restricts the use of a JVM.

20 Claims, 7 Drawing Sheets

(56) References Cited

U.S. PATENT DOCUMENTS

| | | | |
|---|---|---|---|
| 6,971,091 B1* | 11/2005 | Arnold | G06F 8/443 718/1 |
| 7,401,324 B1* | 7/2008 | Dmitriev | G06F 11/3466 717/130 |
| 8,245,206 B2* | 8/2012 | Lagergren | G06F 9/45504 717/141 |
| 8,291,391 B2* | 10/2012 | Lee | G06F 9/44521 717/136 |
| 8,365,157 B2* | 1/2013 | Lagergren | G06F 8/41 717/148 |
| 8,793,670 B2* | 7/2014 | Lagergren | G06F 8/443 717/148 |
| 10,324,693 B2* | 6/2019 | Lai | G06F 8/41 |
| 10,732,608 B2* | 8/2020 | Janssen | G06F 8/436 |
| 2002/0059564 A1* | 5/2002 | Bader | G06F 8/443 717/140 |
| 2002/0092005 A1* | 7/2002 | Scales | G06F 8/443 717/162 |
| 2003/0237079 A1* | 12/2003 | Aggarwal | G06F 8/433 717/146 |
| 2004/0098710 A1* | 5/2004 | Radigan | G06F 8/433 717/144 |
| 2005/0091650 A1* | 4/2005 | Heeb | G06F 8/443 717/148 |
| 2007/0136719 A1* | 6/2007 | Lagergren | G06F 8/4441 717/140 |
| 2008/0115119 A1* | 5/2008 | Lagergren | G06F 8/52 717/148 |
| 2008/0147955 A1* | 6/2008 | Lagergren | G06F 8/443 711/6 |
| 2009/0172652 A1* | 7/2009 | Simon | G06F 8/443 717/148 |
| 2010/0064276 A1* | 3/2010 | Lee | G06F 9/45508 717/118 |
| 2013/0152063 A1* | 6/2013 | Lagergren | G06F 8/443 717/148 |
| 2014/0164727 A1* | 6/2014 | Susnea | G06F 12/023 711/170 |
| 2016/0011857 A1* | 1/2016 | Grover | G06F 9/4552 717/148 |
| 2017/0139690 A1* | 5/2017 | Pesarese | G06F 8/41 |
| 2017/0147299 A1* | 5/2017 | Lai | G06F 8/41 |
| 2017/0269950 A1* | 9/2017 | Lu | G06F 9/45508 |
| 2018/0032055 A1* | 2/2018 | Janssen | G06F 8/436 |
| 2021/0034356 A1* | 2/2021 | Zhou | G06F 9/45508 |
| 2023/0298696 A1* | 9/2023 | Sirota | G16B 40/20 702/19 |

* cited by examiner

TECHNIQUES TO CONVERT BYTECODE GENERATED FOR A FIRST EXECUTION ENVIRONMENT TO MACHINE CODE FOR A SECOND EXECUTION ENVIRONMENT

BACKGROUND

For various programming languages, including but not limited to Java, source code written in a high-level programming language is compiled into a lower-level representation. For example, a compiler may translate human-readable source code into a platform-independent, low-level representation of the source code referred to as bytecode. Bytecode is not the machine code for any particular computer, and may be portable among computer architectures. Bytecode may be translated into a machine code during execution of a program, in a process that is known as just-in-time compilation (JIT). A JIT compiler may translate Java bytecode into native machine language during execution of a program.

Various aspects of methods and systems described above may be improved, including but not necessarily limited to improved run-time performance.

Figure 1:
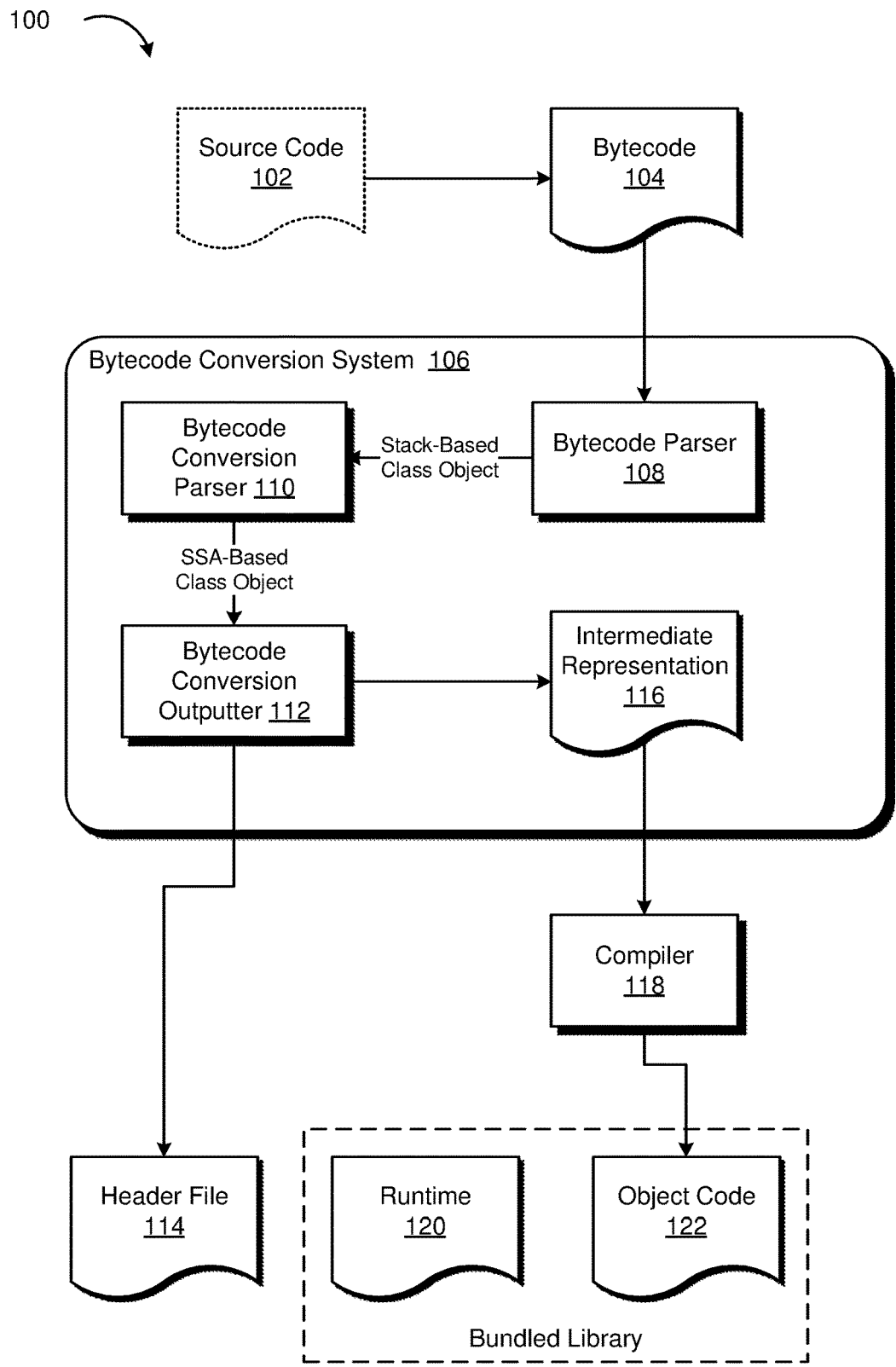
FIG. 1 illustrates a computing environment in which bytecode may be used to generate object code, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for converting bytecode generated for a first execution environment into machine code that is operable to run in a second execution environment. In some embodiments, bytecode generated for a first execution environment requires the use of a runtime environment (e.g., virtual machine instance with a just-in-time compiler) that is not implemented or not otherwise usable in a second execution environment.

Source code written in a human-readable programming language is typically written and then compiled to run on a target environment. For example, source code written in Java may be compiled into bytecode that can be executed in a target environment that implements or otherwise supports a Java Virtual Machine (JVM). While many different underlying computer architectures may support execution of bytecode, JVM has not been implemented in many environments. For example, compiled Java code (e.g., bytecode) may be inoperable on environments that do not support or otherwise implement JVMs, and there are various operating system that do not allow or restrict the use of JVMs. It should be noted that Java is merely an illustrative example and that, more generally, bytecode generated for execution in a first execution environment may be incompatible with or otherwise unable to be executed in a second execution environment.

In various embodiments, human-readable source code is compiled using a compiler to generate bytecode for a first target execution environment, and this generated bytecode is used to generate an analogous compiled object file that may be used to execute the same behavior in a second execution environment different from the first execution environment. It may be the case that the bytecode generated for the first execution environment is incompatible with the second execution environment—for example, a dependency (e.g., virtual machine) that is required to run the bytecode generated for the first execution environment may not be available in the second execution environment. In other cases, the bytecode may be optimized for the second execution environment, for example, by generating analogous code that removes the dependency or need for a virtual machine instance to perform the functionality of the bytecode.

In at least one embodiment, a bytecode conversion system consumes bytecode in the form of a .class file, interprets the bytecode into a language-independent intermediate representation (IR), and then generates a bundle package comprising executable code written for a target environment— for example, a package of executable files that can be executed within an operating system. In some cases, source written for one target execution environment (e.g., Java source written to be executed using a JVM instance) may transposed to run in a different execution environment (e.g., within an operating system environment that does not provide support for JVM instances).

A bytecode conversion system may receive or otherwise obtain stack-based bytecode and convert stack-based operations to a single static assignment (SSA) language-based intermediate representation (IR) using techniques, as described below in greater detail. Object-oriented data structures such as classes may be translated into a SSA-based language in a multi-stage conversion that maps class state (data, fields, etc.) and class behavior (methods) to SSA-based IR code. In an illustrative process, source code is compiled to generate a .class file. For example, Java source code may be compiled using a Java compiler to generate one or more .class files, Kotlin source code may be compiled using a Kotlin compiler to generate one or more .class files, Scala source code may be compiled compiler to generate one or more .class files, and so forth. A .class file is an example of bytecode that is generated to be run in a target execution environment. A software-based class parser may be used to parse one or more generated .class files (e.g., compiled from Java source code, Kotlin source code, Scala source code, etc.). In at least one embodiment, a Rust class file parser library reads bytecode in a .class file and loads the contents of the .class file from storage into memory (e.g., DRAM memory). The bytecode read into memory may include a sequence of stack-based opcodes that represents the functionality of a program or application when executed.

A bytecode conversion system may receive the in-memory representations of the stack-based .class objects and interprets the bytecode into an SSA-based intermediate representation such as LLVM-IR. In addition to translating stack-based opcodes into SSA-based opcodes, The Bytecode conversion system may also handle converting stack-based virtual machine functionality to the SSA used by LLVM-IR. For example, memory management functionality (e.g., garbage collection) typically handled by a Java Virtual Machine may instead by implemented by a runtime library (e.g., dynamically linked library) that is linked to native code. In various embodiments, .class files are parsed and then used to generate header files for each converted .class file. The generated header files, in various embodiments, include generated function names that are determined in a uniform manner that guarantees uniqueness—thereby ensuring that generated functions from one .class file will be distinguishable from those generated from another .class file.

In various embodiments, a bytecode conversion system compiles all generated LLVM-IR code into object files. A LLVM compiler such as LLC may be used to compile and optimize LLVM-IR code into .o object files. In various embodiments, the compiler generates the .o object file for a particular execution environment (e.g., to run on a specific operating system or operating system version). A user may specify the target execution environment. The object files may be native code that can be executed in the target execution environment, whereas the original .class file may be incompatible with the target execution environment.

In various embodiments, a bytecode conversion system compiles a runtime library that .o object files have a dependency on. These runtime libraries may be generated ahead of time and linked to the .o object files as dependencies. In various embodiments, the runtime library replicates functionality that is needed for execution in the target execution environment. For example, a Java .class file may implicitly rely on memory management functionality of its execution environment (e.g., the JVM's garbage collector). Likewise, when a .class bytecode is converted to a native .o object file, the memory management functionality that is relied upon by the .class bytecode may be implemented by a runtime library that the .o object file depends on, to manage the allocation and de-allocation of memory that the .o object file utilizes. In various embodiments, a compiled .o object file and runtime library are bundled into a single execution unit, such as a single .a archive library file. In various embodiments, other executable code may then leverage the generated header file and/or bundled archive and invoke functionality of the .class bytecode in an execution environment that the .class bytecode was not originally designed to run in.

FIG. 1 illustrates a computing environment 100 in which bytecode may be used to generate object code, in accordance with one or more example embodiments of the present disclosure. In various embodiments, bytecode that is generated for a first execution environment is used to generate object code for a second execution environment, wherein the bytecode is incompatible with the first execution environment. As an example, Java bytecode may be used to generate object code for a target execution environment that does not support a JVM for running the Java bytecode.

Source code 102 may refer to a file of human-readable code written in a human-readable programming language that is typically written by a user (e.g., software developer) and then compiled or interpreted to run on a target environment. Source code is typically not directly executed, but rather, is compiled, interpreted, or otherwise translated to lower-level machine-code instructions. In various embodiments, human-readable source code 102 is compiled using a compiler to generate bytecode 104 for a first target execution environment.

It should be noted that source code 102 may be inaccessible or otherwise not available to Bytecode conversion system 106. In various embodiments, Bytecode conversion system 106 operates directly on bytecode 104 and does not require the underlying source code 102 used to generate bytecode 104 to be made available. As denoted by the dotted lines surrounding source code 102, source code 102, in at least one embodiment, source code 102 is optional and may be omitted in various environments such that Bytecode conversion system 106 does not need access to source code 102 to generate header file 114 and/or object code 122.

Bytecode 104 may refer to a file that is not the machine code for any particular computer, and may be portable among computer architectures. Bytecode may be translated into a machine code during execution of a program in a process that is known as just-in-time compilation (JIT). As an example, in Java, Java source code may be compiled using a Java compiler to produce Java bytecode (e.g., a .class file) and the Java bytecode may be compiled using a JIT compiler within an execution environment of a JVM to produce native machine code for the machine or environment that the code is being executed on. Bytecode 104 may be a .class file generated from Kotlin, Scala, or Java source code, CIL bytecode generated from C# source code, and so forth. Bytecode may comprise code that is portable among different computer architectures but is not directly executable (e.g., without translation) on a particular computer architecture. Bytecode—which may alternatively be described as to portable code or p-code—may refer a form of instruction set designed for efficient execution by a software interpreter. Bytecode may be contrasted to human-readable source code, bytecodes are compact numeric codes, constants, and references (normally numeric addresses) that encode the result of compiler parsing and performing semantic analysis of things like type, scope, and nesting depths of program objects. Bytecode may be contrasted to machine code in that a bytecode program may be executed by parsing and directly executing the instructions, one at a time, for example, by using a just-in-time (JIT) compiler of a virtual machine to translate bytecode into machine code at runtime. It should be apparent, then, that the bytecode may be executed on various execution environments (e.g., different hardware) that implement a virtual machine that can translate the bytecode into machine-code. For example, bytecode may run on a first hardware configuration using a first hardware-specific virtual machine to generate first machine code and the same bytecode may be run on a second hardware configuration using a second, different, hardware-specific virtual machine to generate second, different, machine code.

Bytecode conversion system 106 may refer to software, hardware, or a combination thereof. In various embodiments, Bytecode conversion system 106 refers to a computer program comprising machine-readable executable code that, as a result of execution by one or more processors of a system, causes the system to transform bytecode 104 generated for a first target execution environment into code that is executable on a second execution environment different from the first environment. In at least one embodiment, bytecode 104 comprises one or more .class bytecode files (e.g., Java-based or Kotlin-based) and Bytecode conversion system 106 transforms the bytecode 104 to an intermediate representation (IR) and then compiles the IR into object code that can be run in a target execution environment that does not natively support .class bytecode. As an illustrative example, .class files written in Java or Kotlin may be converted into object code that can be executed in an operating system environment that does not support JVMs.

Bytecode conversion system 106 may take bytecode 104 generated for one execution environment and generate analogous compiled object code 122 that may be used to execute the same behavior in a different execution environment. It may be the case that bytecode 104 is incompatible with various execution environments—for example, a dependency (e.g., virtual machine) that is required to run bytecode 104 generated for one execution environment may not be available in another execution environment. In some embodiments, bytecode 104 may be optimized for an execution environment, for example, by generating analogous object code that removes the dependency or need for a virtual machine instance to perform the functionality of the bytecode.

Bytecode conversion system 106 may comprise bytecode parser 108. Bytecode parser 108 may refer to an optional software component that reads bytecode 104 from disk and into memory (e.g. DRAM). In at least one embodiment, bytecode parser 108 is a software library that reads into memory a bytecode file that includes a sequence of stack-based opcodes that represents the functionality of a program/application when executed, or a portion thereof.

Bytecode conversion system 106 may comprise Bytecode conversion parser 110. Bytecode conversion parser may refer to a software library that takes stack-based class objects and converts them into corresponding Bytecode conversion class objects. In various embodiments, stack-based class objects are Java-based class objects, and Bytecode conversion class objects refer to a single static assignment (SSA) representation of the stack-based objects. The SSA representation may be provided to Bytecode conversion outputter 112, which generates output files including but not limited to header 114 and intermediate representation 116 files. Header 114 may include function signatures and provide a way for other code to call into functions and routines included in the object code 122. In various embodiments, compiler 118 is used to compile or otherwise translate intermediate representation 116 into object code 122 for a target execution environment. LLC is an example of an LLVM-IR compiler that can be used to generate object code 122 and/or runtime 120. The target execution environment may be specified according to a runtime environment, operating system, instruction set architecture, and so forth. Object code 122 may be bundled with runtime 120. Runtime 120 may refer to a runtime library that is linked to object code 122 or otherwise made available to aid in the execution of object code 122. For example, for Java-based bytecode, a Java Virtual Machine is relied upon to perform memory management, which is implicitly dependent upon by Java bytecode, as there are no explicit instructions to allocate or free memory. In various embodiments, runtime 120 is used to perform memory management, thread management, and various other functionality that would otherwise be performed by a JVM.

Figure 2:
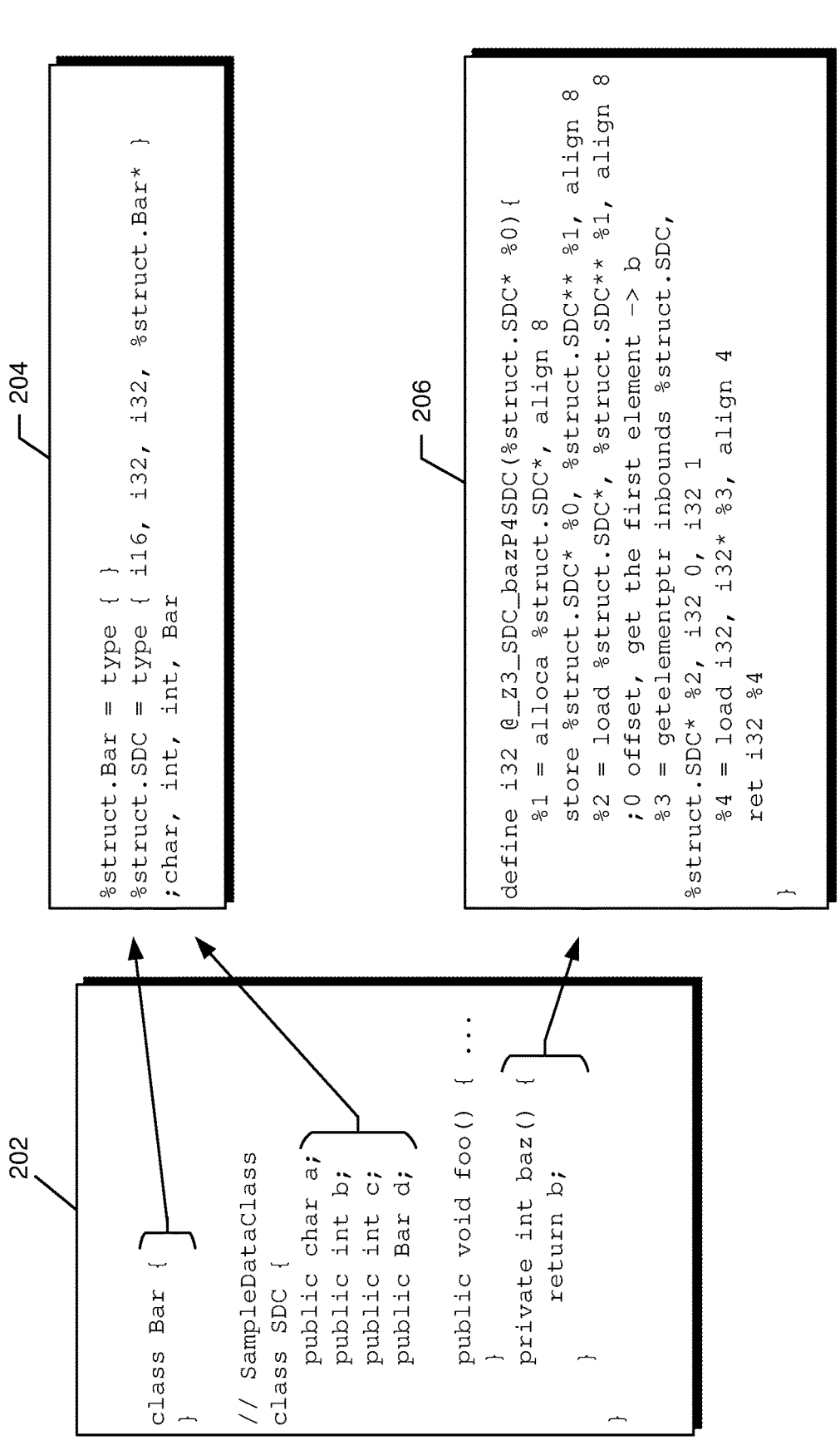
FIG. 2 illustrates a computing environment in which stack-based bytecode is translated into single static assignment (SSA)-based representations, in accordance with one or more example embodiments of the present disclosure.

FIG. 2 illustrates a computing environment 200 in which stack-based bytecode is translated into SSA-based representations, in accordance with one or more example embodiments of the present disclosure. FIG. 2 illustrates a source code 202 that may be compiled to bytecode, and then the bytecode may be parsed to a determined stack-based class object, for example, using techniques discussed above in connection with FIG. 1. In various embodiments, a stack-based class object comprises two components—a state component 204 (e.g., data variables) and a functionality component 206 (e.g., methods) that are handled using separate conversion strategies. Data classes may comprise non-static variables associated with various fields, properties, child classes, and so forth. FIG. 2 may be implemented using techniques described throughout this disclosure, such as those discussed in connection with FIGS. 1 and 3-7.

In various embodiments, a system such as a bytecode conversion system receives or otherwise obtains stack-based bytecode and converts stack-based operations to a single static assignment (SSA) language-based intermediate representation (IR). Object-oriented data structures such as classes may be translated into a SSA-based language in a multi-stage conversion that maps class state (data, fields, etc.) and class behavior (methods) to SSA-based IR code. In an illustrative process, source code is compiled to generate a .class file. For example, Java source code may be compiled using a Java compiler to generate one or more class files, Kotlin source code may be compiled using a Kotlin compiler to generate one or more class files, and so forth. A .class file is an example of a bytecode file that can be used to generate an object file generated to run in a target execution environment. A software-based class parser may be used to parse one or more generated .class files (e.g., compiled from Java source code, Kotlin source code, etc.). In at least one embodiment, a Rust class file parser library reads bytecode in a .class file and loads the contents of the .class file from storage into memory (e.g., DRAM memory).

In various embodiments, state is mapped from stack-based opcodes to SSA-based representations. For example, bytecode may be parsed and class objects may be extracted. As an example, consider the following source code may be parsed to a class object, which may be based on a Java or Java-like programming language:

class Bar {
}
class SDC {//SomeDataClass
   public void foo( ){ . . . }//sample function foo( )
   private int baz( ){
     return b;
   }
   public char a;
   public int b;
   public int c;
   public Bar d;
}

It should be noted that while Java or Java-like source code is depicted above, this is done so for clarity of example and that the Bytecode conversion system operates on bytecode for the corresponding class definitions depicted in FIG. 2 and elsewhere.

In various embodiments, a bytecode conversion parser or other suitable system parses bytecode as functional code (e.g., the actual execution of what will take place) and state. A data class comprises non-static variables associated with fields, properties, etc. When a data object is detected, the bytecode conversion parser may convert the stack-based data or state into a SSA-based representation. In various embodiments, this mapping enforces a strict alignment in which the representation includes stack variables in the same order in which they appear. For example, as depicted in FIG. 2, stack-based data objects include a character variable "a", an integer variable "b", an integer variable "c", and a custom Bar structure variable "d". In various embodiments, standard variable types such as characters and integers are mapped to corresponding LLVM-IR constructs. For example, a character variable in Java is two bytes in size and maps to a "i16" (e.g., 16-bit variable) and an integer variable in Java is four bytes in size and maps to a "i32" (e.g., 32-bit variable). For custom structures, a dependency tree is created and maintained so that the bytecode conversion system is able to determine the order in which different custom structures are defined, avoid circular dependencies, and ensure that definitions of all data classes that will be used are included in the IR-based representations. For example, when a bytecode conversion system converts a SDC object class, it will have a dependency on a pointer to a Bar object class and will need to know what a Bar object is and where it is located and how it should be interpreted.

Data or state of class object may be translated into LLVM-IR code. A state component 204 of the SSA-based representation of the above stack-based Bar and SDC class objects may be according to the following:

% struct.Bar=type{ }
; The name is somewhat arbitrary—even 'struct' is optional % struct.SDC=type
{i16, i32, i32, % struct.Bar*}; char, int, int, Bar In various embodiments, class function names are mangled to create unique class names in the SSA-based representation. This may be used to differentiate between multiple classes or functions with the same name (e.g., in different scopes), and they will resolve to a unique name in the IR code.

Functionality (e.g., class methods, static methods) may be implemented by mapping stack-based opcodes into SSA-based instructions with analogous behavior. As an example, consider the private baz( ) function depicted in FIG. 2, which returns the value of a non-static integer variable "b" for a specific instance of the SDC class object. First, the name of the function is decorated to be unique. The decoration may include a class, scope, or namespace in which the function is visible. Types may be mapped—for example, an IR-based i32 type representing a 32-bit integer may be mapped to a Java integer type. In various embodiments, SSA-based variables may be dereferenced and stored in separate variables for each instance or use. For example, in LLVM-IR, getelementptr may be used to access contents within a structure. In various embodiments, the "baz" function above may be translated into the following LLVM-IR code:

define i32 @_Z3_SDC_bazP4SDC(% struct.SDC*%0){
%1=alloca % struct.SDC*, align 8
store % struct.SDC*%0, % struct.SDC**%1, align 8%
2=load % struct.SDC*, % struct.SDC**%1, align 8
; 0 offset, get the first element→b
%3=getelementptr inbounds % struct.SDC, % struct.SDC*%2, i32 0, i32 1%
4=load i32, i32*%3, align 4
ret i32%4
}

As depicted in FIG. 2 and the first line above, the class function baz( ) is translated into a fully qualified name. The fully qualified name may be a name that uniquely resolves to a function name. The return type of the function may be encoded. For example, since baz( ) returns an integer, the LLVM-IR representation includes a 32-bit integer (i.e., the same size as a Java integer) in the definition of the baz( ) function. In various embodiments, the IR-based function definition is determined based on the stack-based class objects. In various embodiments, the class signature mapping enforces a strict alignment in which the IR-based function definition includes variables in the same order they appear in the corresponding stack-based function signature. In some embodiments, IR-based function definitions include an additional parameter that is used to store the address of a specific IR-based class object, as IR-based representations do not have class concepts, according to various embodiments. Accordingly, the specific instance of an IR-based class object may be included in the IR-based function definition to specify a specific IR-based class object for which the function is being executed for/on. Thus, even though the stack-based private function signature of baz( ) is empty, it is translated into an IR-based function definition that includes one parameter for an SDC pointer referring to the IR-based class object that baz( ) is being performed on. This variable is referred to as "%0" in the sample LLVM-IR code above.

In various embodiments, the "alloca" command is used to allocate memory on the stack frame of the currently executing function, to be automatically released when this function returns to its caller. The 'alloca' instruction allocates size of (<type>)*NumElements bytes of memory on the runtime stack, returning a pointer of the appropriate type to the program. If "NumElements" is specified, it is the number of elements allocated, otherwise, "NumElements" is defaulted to be one. If a constant alignment is specified, the value result of the allocation is guaranteed to be aligned to at least that boundary. If not specified, or if zero, the target can choose to align the allocation on any convenient boundary compatible with the type. Memory is allocated, and a pointer is returned. The allocated memory is uninitialized, and loading from uninitialized memory produces an undefined value. Allocated memory is automatically released when the function returns. Memory is allocated at %1. Then, the values of SDC that are pointed to are loaded into the memory pointer, located at %2. Then, a bytecode conversion system performs a calculation for this getelementptr function in LLVM-IR, which dereferences the field on the SDC object, referring to the data from the specific SDC object at hand. In various embodiments, an SSA-based command such as getelementptr calculates the memory offset for an object that is passed into it. So, it can be passed into it is technically an array of structs or elements or a set of memory that points to a number of objects. Continuing, the first "i32 0" refers to a first (zero-indexed) memory location from %2, which refers to the current SDC object being operated on. Next, "i32 1" indicates the parameter/field offset by one i32, which is, in this case, accesses the second data variable of SDC, which is the "b" integer variable. Then, the contents from %3 are loaded to %4 and then returned at the end of this IR-based function. If the variable "c" were to be turned instead, then "i32 1" in the getelementptr line would instead be "i32 2"— noting that LLVM-IR is zero-indexed, so "i32 2" would refer to the third data element of the SDC object.

For methods and types defined in a second class, but are referenced within a first class being converted, different techniques may be used for functionality (e.g., methods) and state (e.g., data). For methods, this is a method declaration and for types, Opaque pointers may be used. For method declarations, the bytecode conversion parser looks for methods defined in a class that is different from the one that is being parsed. When one is encountered, a declaration statement is added to the IR-based representation. In LLVM-IR, this may be implemented as:

declare i32 @foo(i8*)

The object file that LLC compiles will include this reference and will require it to be linked into an executable.

For data types that are encountered in a class being converted, which are defined elsewhere (e.g., the self on a declared member method of another class, for instance), such data types are declared an opaque type, according to at least one embodiment. In LLVM-IR, this may be implemented as:

% X=type opaque where % X is the name or identifier of the data type, with no need for details of the internal state to be defined in the class being converted. At a later point in time—for example, in another .class file where the data type is defined—the structure of the opaque type may be specified.

Figure 3:
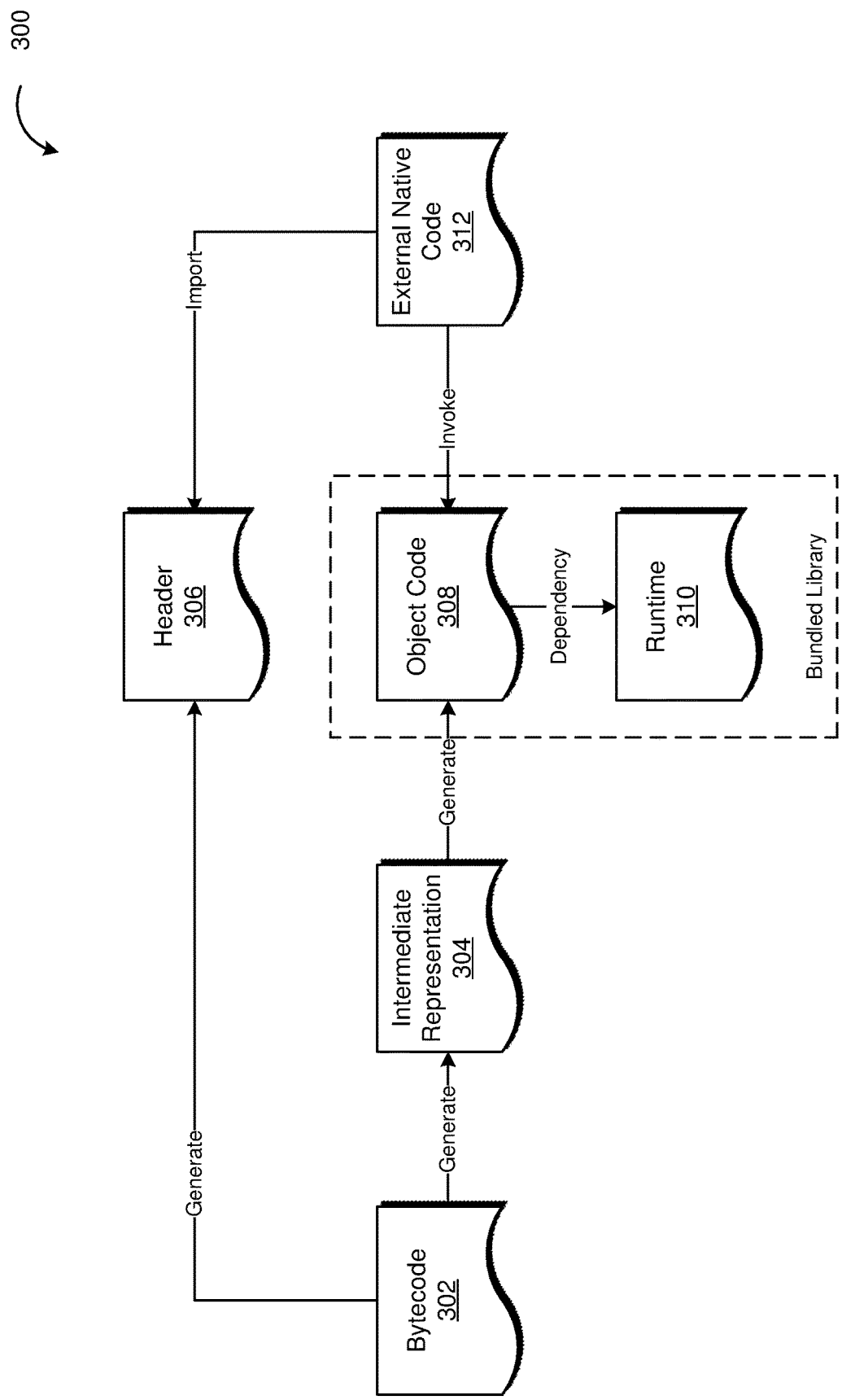
FIG. 3 illustrates a computing environment in which external native code calls into object code generated from bytecode, according to at least one embodiment.

FIG. 3 illustrates a computing environment 300 in which external native code calls into object code generated from bytecode, according to at least one embodiment. In at least one embodiment, FIG. 3 illustrates bytecode 302 that is translated to native machine code that can be invoked by other native machine code. In various embodiments, the bytecode cannot be directly invoked by the external native machine code, for example, where the bytecode is a Java .class code and the execution environment for the native machine code does not support or is otherwise not able to run a JVM. FIG. 3 may be implemented using techniques described throughout this disclosure, such as those discussed in connection with FIGS. 1, 2, and 4-7.

Bytecode 302 may refer to one or more files that are not the machine code for any particular computer, and may be portable among computer architectures. Bytecode may rely on a JIT compiler to translate the bytecode into a machine code during execution of a program in a process that is known as just-in-time compilation (JIT). As an example, in Java, Java source code may be compiled using a Java compiler to produce Java bytecode (e.g., a .class file) and the Java bytecode may be compiled using a JIT compiler within an execution environment of a JVM to produce native machine code for the machine or environment that the code is being executed on. Bytecode 302 may be a .class file generated from Kotlin, Scala, or Java source code, CIL bytecode generated from C# source code, and so forth. Bytecode may comprise code that is portable among different computer architectures but is not directly executable (e.g., without translation) on a particular computer architecture.

In at least one embodiment, bytecode conversion system consumes bytecode 302 in the form of a .class file, interprets the bytecode into a language-independent intermediate representation (IR), and then generates a bundle package comprising executable code written for a target environment—for example, a package of executable files that can be executed within an operating system. In some cases, source written for one target execution environment (e.g., Java source written to be executed using a JVM instance) may transposed to run in a different execution environment (e.g., within an operating system environment that does not provide support for JVM instances).

Intermediate representation 304 may refer to one or more files generated from bytecode 302. The intermediate representation may be used to provide the middle layers of a complete compiler system, taking intermediate representation (IR) code from a compiler and emitting an optimized IR. This new IR can then be converted and linked into machine-dependent assembly language code for a target platform. For example, in at least one embodiment, the IR can be accepted from the GNU Compiler Collection (GCC) toolchain, allowing it to be used with a wide array of existing compiler front-ends written for that project.

The intermediate representation may be implemented in a language-independent instruction set and type system. In various embodiments, each instruction in the intermediate representation is in static single assignment form (SSA), meaning that each variable (e.g., a typed register) is assigned exactly once and then frozen. This helps simplify the analysis of dependencies among variables. The intermediate representation may be compiled statically or left for late-compiling from the IR to machine code via just-in-time compilation (JIT), similar to Java.

Header 306 may refer to one or more files that expose functionality that can be found in the intermediate representation simply so that when it is compiled, another code can invoke the functionality included in object code 308. In various embodiments, header 306 is the integration point into other parts of the software. In at least one embodiment, C header files are created. In at least one embodiment, the header file exposes a set of application programming interfaces (APIs) that can be directly invoked by programs (e.g., C/C++ based programs).

In various embodiments, a bytecode conversion system uses an IR compiler (e.g., LLC for LLVM-IR code) to generate object code 308 for a target execution environment. The target execution environment may be specified according to a runtime environment, operating system, instruction set architecture, and so forth. Object code may be machine-readable code that can be executed in a particular execution environment that is different from the execution environment for which bytecode 302 is used in. For example, Java bytecode 302 may be designed to run various environments that implement a JVM. Object code 308 may be generated for an operating system environment that does not support JVMs or for which the use of JVMs is restricted in one manner or another. For example, some operating systems restrict how applications can be run in the background, in services, and/or security permissions wherein administrator access or other elevated privileges may be needed to run the JVM.

Runtime 310 may refer to a runtime library that is linked to object code 308 or otherwise made available to aid in the execution of object code 308. For example, for Java-based bytecode, a Java Virtual Machine is relied upon to perform memory management, which is implicitly dependent upon Java bytecode, as there are no explicit instructions to allocate or free memory. In various embodiments, runtime 310 is used to perform memory management, thread management, and various other functionality that would otherwise be performed by a JVM. In some embodiments, runtime 310 is shared between multiple object codes. For example, the same garbage collection library may be shared between multiple object code files, as the memory management functionality needed from each of the object code files may be the same or substantially similar.

External native code 312 may refer to other native code (e.g., compiled from C/C++ source code). In various embodiments, bytecode 302 implements routines, methods, functions, etc. that implement various functionality that may be leveraged by other code. However, bytecode 302 may not be able to be directly invoked by external native code 312. For example, external native code 312 may be compiled from C++ source code whereas bytecode 302 is compiled from Java source code. C++ source code cannot directly include or otherwise reference functions implemented in Java. Bytecode conversion system may be used to generate object code 308 that implements the functionality of bytecode 302 and that the external native code 312 can directly invoke, similar to how the native source code would access. For example, C++ source code can include a line of code to include or import a header file (e.g., header 306) that defines the function signatures that can be invoked and the external native code 312 can be linked to object code 308. Object code 308 may furthermore have a dependency on a runtime library.

Figure 4:
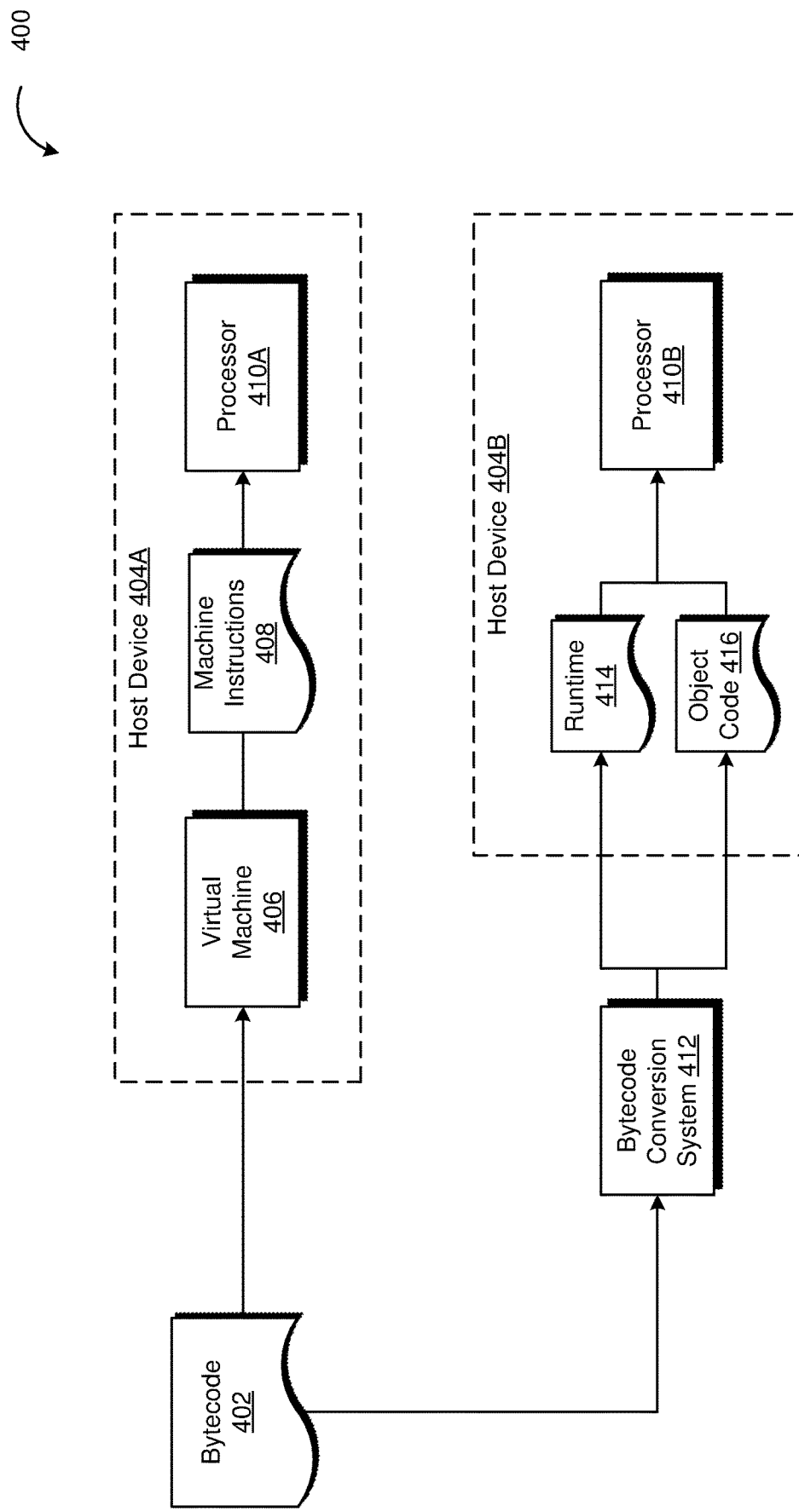
FIG. 4 illustrates a computing environment in which bytecode is translated into native machine code to run in a target execution environment without the need for just-in-time compilation, according to at least one embodiment.

FIG. 4 illustrates a computing environment 400 in which bytecode is translated into native machine code to run in a target execution environment without the need for just-in-time compilation, according to at least one embodiment. In at least one embodiment, FIG. 4 illustrates bytecode 302 that is translated to native machine code that can be invoked by other native machine code without the use of a virtual machine and/or just-in-time compilation. In various embodiments, the bytecode cannot be directly invoked by the external native machine code, for example, where the bytecode is a Java or Kotlin .class code and the execution environment for the native machine code does not support or is otherwise not able to run a JVM. FIG. 4 may be implemented using techniques described throughout this disclosure, such as those discussed in connection with FIGS. 1-3 and 5-7.

Bytecode 402 may refer to one or more files that are not the machine code for any particular computer, and may be portable among computer architectures. Bytecode may rely on a JIT compiler to translate the bytecode into a machine code during execution of a program in a process that is known as just-in-time compilation (JIT). For example, source code written in managed code (e.g., Java or C#) may be compiled to bytecode 402 and the bytecode may be executed on a first host device 404A that supports a runtime environment comprising a virtual machine 406. For example, in the case of Java, the runtime environment may include a JVM comprising a just-in-time (JIT) compiler that translates bytecode 402 into machine instructions 408 according to the instruction set architecture of host device 404A. The machine instructions 408 may comprise opcodes or other instructions that are supported by one or more processors of device 404A, such as processor 410A depicted in FIG. 4.

In various embodiments, host device 404B may refer to an execution environment that does not support a runtime environment for direct execution of bytecode 402. For example, host device 404B may refer to a hardware device, operating system, instruction set architecture, processor architecture, etc. that does not support a virtual machine needed to translate bytecode 402 into suitable machine instructions that can be executed by one or more processors of host device 404B, such as processor 410B. In at least one embodiment, bytecode 402 is a .class bytecode file and host device 404B is a device whose operating system does not support or otherwise restricts execution of a runtime environment such as a JVM or JIT compiler that can translate the bytecode into opcodes according to an instruction set architecture supported by processor 410B.

In various embodiments, bytecode conversion system 412 may be used to generate a runtime 414 and object code 416 for the host device 404B as the target execution environment. In at least one embodiment, bytecode 402 is provided to a system running the bytecode conversion system 412 (e.g., different system from host device 404A and host device 404B). The object code 416 may comprise machine code for a target instruction set architecture supported by processor 410B. Object code 416 may link to or otherwise take a dependency on runtime 414, which may support various functionality that would otherwise be provided by the virtual machine, such as memory management.

In some embodiments, host device 404B is capable of running a virtual machine (e.g., virtual machine 406), but is able to more efficiently execute the functionality of bytecode 402 through direct execution of object code 416. This may, for example, be due to the additional memory and/or processing overhead associated with just-in-time compilation, which involves an additional layer of inline translation of bytecode to machine instructions. Furthermore, in some embodiments, host device 404B may not be able to run a virtual machine continuously. For example, the operating system of host device 404B may restrict virtual machine to run only in a foreground application.

Figure 5:
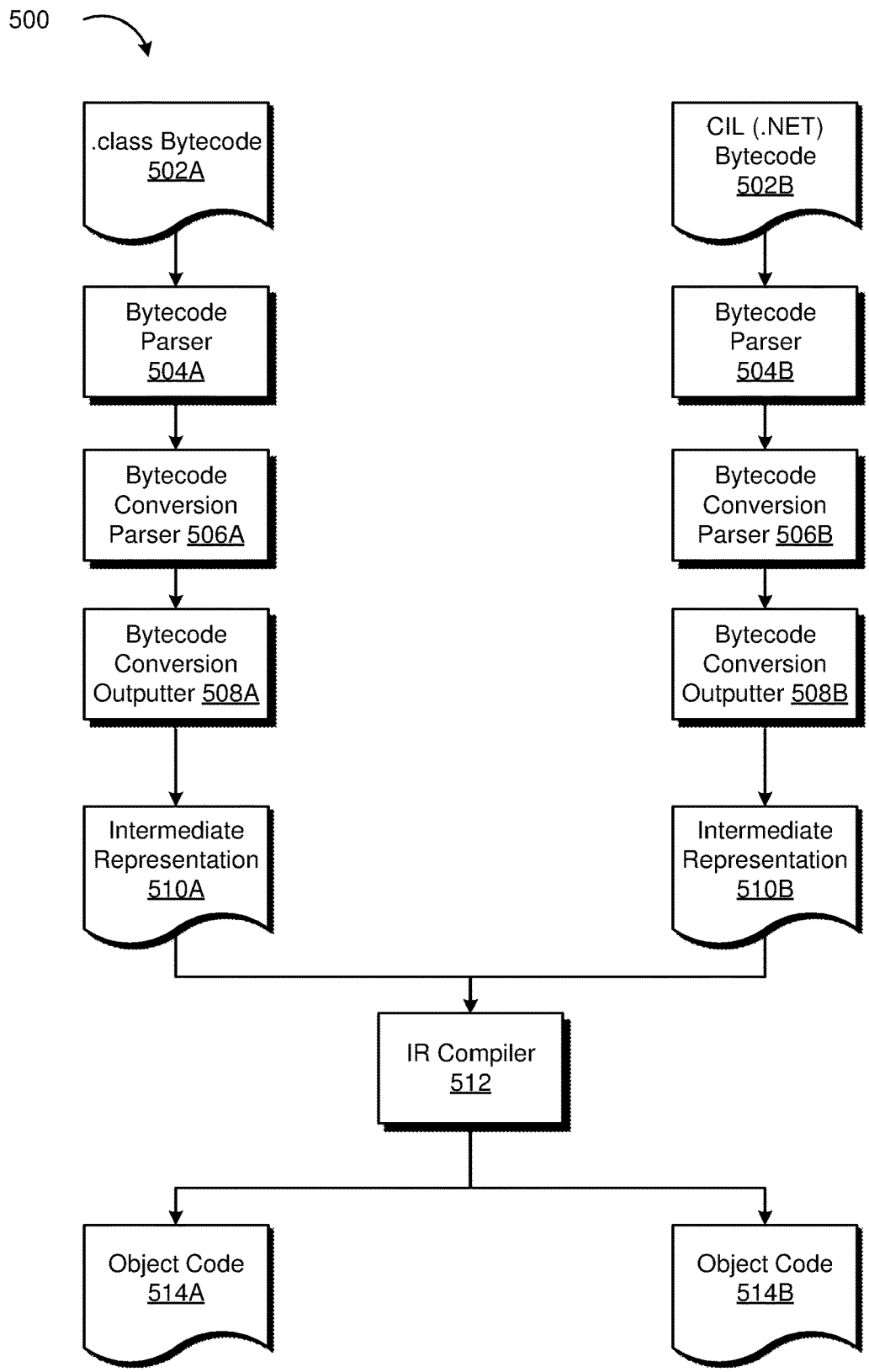
FIG. 5 illustrates a computing environment in which a bytecode conversion system supports conversion of multiple types of bytecode, according to at least one embodiment.

FIG. 5 illustrates a computing environment 500 in which a bytecode conversion system supports conversion of multiple types of bytecode, according to at least one embodiment. In at least one embodiment, FIG. 5 may be implemented using techniques described throughout this disclosure, such as those discussed in connection with FIGS. 1-4 and 6-7.

In various embodiments, a bytecode conversion system is able to handle the conversion of multiple types of bytecode into a common IR-based representation, regardless of the original source code format. For example, .class bytecode 502A may refer to bytecode generated from Java/Scala/Kotlin source code, and CIL bytecode 502B may refer to bytecode generated from C# source code. These different source code formats may generate different bytecode formats that are incompatible with each other.

In at least one embodiment, bytecode conversion system comprises first bytecode parser 504A, first bytecode conversion parser 506A, and first bytecode conversion outputter 508A. This first pipeline 504A/506A/508A may be used to generate a first SSA-based intermediate representation such as LLVM-IR from a first bytecode format, such as .class bytecode 502A. Additionally, the same bytecode conversion system may further comprise second bytecode parser 504B, second bytecode conversion parser 506B, and second bytecode conversion outputter 508B. This second pipeline 504B/506B/508B may be used to generate a second SSA-based intermediate representation 510B in the same format as first SSA-based intermediate representation 510A. For example, both Java-based .class bytecode and C#-based CIL bytecode may both be translated to LLVM-IR code.

As both first SSA-based intermediate representation 510A and second SSA-based intermediate representation 510B are in the same format, a common IR compiler 512 may be used on IR code generated from both types of bytecode. For example, IR compiler 512 may be used to generate first object code 514A that implements the functionality of .class bytecode 502A and may also be used to generate second bytecode 514B that implements the functionality of CIL bytecode 502B. In various embodiments, bytecode conversion system also generates additional runtime libraries for each type of bytecode that may implement different functionalities based on the specific runtime environments for each.

In various embodiments, a bytecode conversion system may be used to generate object code for a variety of different execution environments from a single source code. For example, source code may be written once by a developer, and bytecode generated from the source code may be translated, by the bytecode conversion system, to one or more object code files that can be used to implement functionality of the bytecode to a variety of different spaces including low-end computing, embedded or Internet-of-Things computing. By generating object files for a variety of target execution environments from the same bytecode, developer fungibility is increased by only requiring knowledge of a single programming language (e.g., Java or the presence of a Java library), which can be converted into system level code that is executed in a performant manner across many different platforms.

Figure 6:
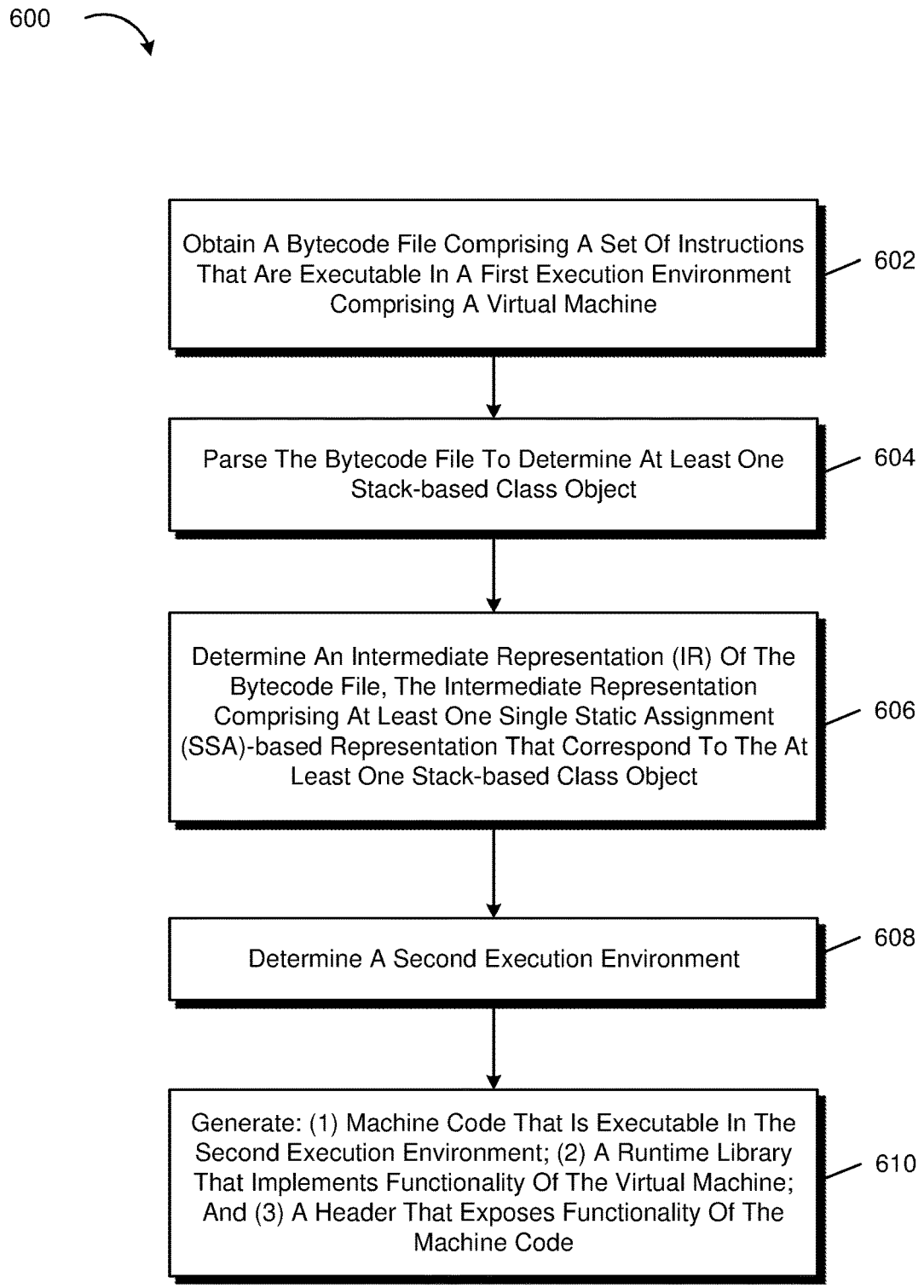
FIG. 6 shows an illustrative example of a process for using bytecode generated in a first execution environment to generate object code that implements the functionality of the bytecode in a different execution environment, in accordance with one or more example embodiments of the present disclosure.

FIG. 6 shows an illustrative example of a process 600 for using bytecode generated in a first execution environment to generate object code that implements the functionality of the bytecode in a different execution environment, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1-5 and 7. In at least one embodiment, process 600 or a portion thereof is implemented by a computing resource service provider.

In at least one embodiment, process 600 comprises a step to obtain 602 a bytecode file comprising a set of instructions that are executable in a first execution environment comprising a virtual machine. A bytecode file may refer to a .class bytecode file that is generated from Java source code, Kotlin source code, and so forth. Other examples of bytecode include CIL bytecode, which may be generated from C# source code. It should be noted that the underlying source code used to generate the obtained bytecode file may be missing or otherwise inaccessible, and that process 600, in at least some embodiments, does not require access to the underlying source code used to generate the bytecode file. In various embodiments, the bytecode relies on the virtual machine to implement various functionality, such as memory management functionality.

In at least one embodiment, process 600 comprises a step to parse 604 the bytecode file to determine at least one stack-based class object. A software-based class parser may be used to parse one or more generated byte code files (e.g., .class files compiled from Java source code, Kotlin source code, etc.). In at least one embodiment, a Rust class file parser library reads bytecode in a .class file and loads the contents of the .class file from storage into memory (e.g., DRAM memory). In some embodiments, determining the intermediate representation (IR) of the bytecode file for a stack-based class object comprises determining a state component of the stack-based class object, determining, based on the state component, an SSA-based data layout, determining, based on the state component, a structure type for the stack-based class object, determining a functionality component of the stack-based class object, determining, based on the functionality component, a fully qualified name of the functionality component, and determining, based on the functionality component, code that dereferences a pointer according to the structure type. The structure type may be an opaque type that is defined later or in another bytecode file.

In at least one embodiment, process 600 comprises a step to determine 606 an intermediate representation (IR) of the bytecode file, the intermediate representation comprising at least one single static assignment (SSA)-based representation that corresponds to the at least one stack-based class object. In various embodiments, a stack-based class object comprises two components—a state component (e.g., data variables) and a functionality component (e.g., methods) that are handled using separate conversion strategies. Conversion strategies described in in connection with FIG. 3 may be utilized to generate IR code.

In at least one embodiment, process 600 comprises a step to determine 608 a second execution environment. The second execution environment may be determined by a user, for example, specified as a parameter of an IR compiler command.

In at least one embodiment, process 600 comprises a step to generate 610 machine code that is executable in the second execution environment; (2) a runtime library that implements functionality of the virtual machine; and (3) a header that exposes functionality of the machine code. The machine code may refer to a .o object file generated from LLVM-IR code. The runtime library may refer to code that is linked to from the machine code. The runtime library may implement memory management functionality (e.g., ref counting) that the bytecode would have relied on a virtual machine to perform.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 7:
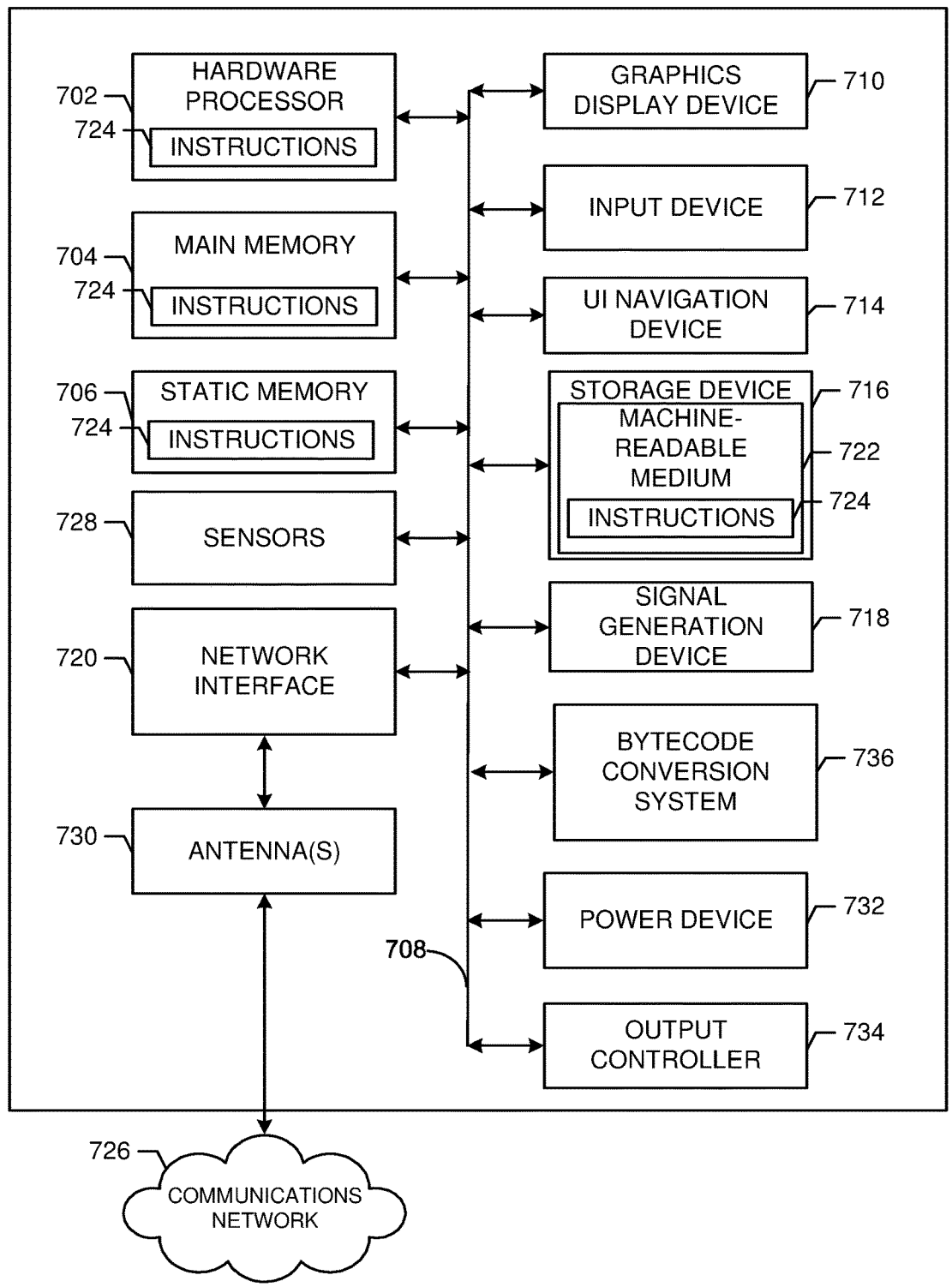
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., implemented in whole or in part in the context of embodiments described in connection with other figures. In some embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include any combination of the illustrated components. For example, the machine 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (e.g., drive unit) 716, a signal generation device 718, and a network interface device/transceiver 720 coupled to antenna(s) 730. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Bytecode conversion system 736 may refer to software that implement functionality described in connection with FIGS. 1-6. For example, bytecode conversion system may implement one or more subsystems that are used to perform conversion of bytecode generated for a first execution environment to machine code operable to be executed in a second execution environment.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that causes the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method, comprising:
    obtaining a bytecode file comprising a set of instructions that are executable in a first execution environment comprising a virtual machine;
    parsing the bytecode file to determine a stack-based class object, wherein the stack-based class object comprises one or more non-static class variables and at least one class method;
    determining, based on the one or more non-static class variables, a first portion of intermediate representation (IR) code that defines a data layout for an IR-based representation of the stack-based class object;
    determining, based on the at least one class method, a second portion of the IR code that dereferences a pointer to an instance of the IR-based representation of the stack-based class object;
    determining a second execution environment; and
    translating, using an IR compiler, the IR code into machine code that is executable in the second execution environment.

2. The computer-implemented method of claim 1, wherein determining the second portion of the IR code comprises:
    determining a fully qualified name of the at least one class method; and
    determining a signature for the fully qualified name comprising a set of parameters according to an ordering of the data layout, wherein the set of parameters further includes the pointer to the instance of the IR-based representation of the stack-based class object.

3. The computer-implemented method of claim 1, wherein:
    the virtual machine comprises a memory management component; and
    the method further comprises generating a runtime library that implements the memory management component in the second execution environment.

4. The computer-implemented method of claim 1, further comprising generating a header file that exposes the machine code to second machine code executable in the second execution environment.

5. A non-transitory computer-readable storage medium storing executable instructions that, as a result of being executed by one or more processors of a computer system, cause the computer system to at least:
    obtain a set of bytecode instructions executable in a first execution environment;
    parse the set of bytecode instructions to determine at least one stack-based class object;
    determine an intermediate representation (IR) of the set of bytecode instructions, wherein the intermediate representation comprising at least one single static assignment (SSA)-based representation that corresponds to the at least one stack-based class object; and
    translate the intermediate representation into machine code that is executable in a second execution environment.

6. The non-transitory computer-readable storage medium of claim 5, wherein the instructions, as a result of being executed by the one or more processors of the computer system, further cause the computer system to:
    determine a state component of the stack-based class object;
        determine, based on the state component, an SSA-based data layout;
        determine, based on the state component, a structure type for the stack-based class object;
        determine a functionality component of the stack-based class object;
        determine, based on the functionality component, a fully qualified name of the functionality component; and
        determine, based on the functionality component, code that dereferences a pointer according to the structure type.

7. The non-transitory computer-readable storage medium of claim 6, wherein the instructions, as a result of being executed by the one or more processors of the computer system, further cause the computer system to:
    generate a SSA-based function of a stack-based class function that comprises the SSA based layout and the pointer.

8. The non-transitory computer-readable storage medium of claim 5, wherein the machine code is generated according to an instruction set architecture of the second execution environment.

9. The non-transitory computer-readable storage medium of claim 5, wherein:
    the set of bytecode instructions comprises Java bytecode; and
    the second execution environment lacks an implementation of a Java Virtual Machine.

10. The non-transitory computer-readable storage medium of claim 9, wherein the instructions, as a result of being executed by the one or more processors of the computer system, further cause the computer system to:
- generate a header file that exposes the machine code to second machine code executable in the second executable environment; and
- generate a runtime library that implements one or more functionality of the Java Virtual Machine.

11. The non-transitory computer-readable storage medium of claim 9, wherein the set of bytecode instructions are generated from Java or Kotlin source code.

12. The non-transitory computer-readable storage medium of claim 5, wherein the intermediate representation is LLVM-IR code.

13. A system, comprising:
- one or more processors; and
- memory storing executable instructions that, as a result of execution by the one or more processors, cause the system to:
- obtain a set of bytecode instructions executable in a first execution environment;
- parse the set of bytecode instructions to determine at least one stack-based class object;
- determine an intermediate representation of the set of bytecode instructions, wherein the intermediate representation comprising at least one single static assignment (SSA)-based representation that corresponds to the at least one stack-based class object; and
- translate the intermediate representation into machine code that is executable in a second execution environment.

14. The system of claim 13, wherein the executable instructions include further instructions that, as a result of execution by the one or more processors, further cause the system to:
- determine a state component of the stack-based class object;
  - determine, based on the state component, an SSA-based data layout;
  - determine, based on the state component, a structure type for the stack-based class object;
  - determine a functionality component of the stack-based class object;
  - determine, based on the functionality component, a fully qualified name of the functionality component; and
  - determine, based on the functionality component, code that dereferences a pointer according to the structure type.

15. The system of claim 14, wherein the SSA-based data layout is aligned according to an order in which stack-based variables are declared in the stack-based class object.

16. The system of claim 13, wherein:
- the first execution environment comprises an implementation of a virtual machine operable to translate the set of bytecode instructions into second machine code; and
- the second execution environment lacks support for the virtual machine.

17. The system of claim 16, wherein the executable instructions include further instructions that, as a result of execution by the one or more processors, further cause the system to:
- generate a header file that exposes the machine code to second machine code executable in the second executable environment; and
- generate a runtime library that implements one or more functionality of the virtual machine.

18. The system of claim 17, wherein the runtime library implements memory management functionality.

19. The system of claim 13, wherein source code used to generate the set of bytecode instructions is inaccessible to the system.

20. The system of claim 13, wherein the machine code is executable by the one or more processors of the system.

* * * * *